United States Patent [19]

Sewell

[11] Patent Number: 5,012,050
[45] Date of Patent: Apr. 30, 1991

[54] DUAL POLE SWITCH ASSEMBLY FOR AN INERTIA ACTUATED SWITCH

[75] Inventor: Michael R. Sewell, Chatham, Canada

[73] Assignee: Siemens Automotive Limited, Chatham, Canada

[21] Appl. No.: 483,860

[22] Filed: Feb. 23, 1990

[51] Int. Cl.⁵ .............................................. H01H 35/14
[52] U.S. Cl. ............................ 200/61.45 R; 200/61.53
[58] Field of Search ...................... 200/61.45 R–61.53

[56] References Cited

U.S. PATENT DOCUMENTS

| | | | |
|---|---|---|---|
| 2,993,100 | 7/1961 | Maeder | 200/61.53 |
| 3,571,539 | 3/1971 | Kaiser et al. | 200/61.53 |
| 4,028,516 | 6/1977 | Hirashima et al. | 200/61.45 M |
| 4,221,940 | 9/1980 | Roth | 200/61.48 X |
| 4,262,177 | 4/1981 | Paxton et al. | 200/61.45 R |
| 4,329,549 | 5/1982 | Breed | 200/61.45 M |
| 4,618,746 | 10/1986 | Schwob et al. | 200/61.45 R |

Primary Examiner—J. R. Scott
Attorney, Agent, or Firm—George L. Boller; Russel C. Wells

[57] ABSTRACT

An inertia switch comprises a mass which actuates an electrical switch assembly upon being subjected to a predetermined velocity change. The switch assembly comprises a set of two electrical contacts that are disposed within a switch enclosure in resiliently deflected, spaced apart conditions so as to make the set normally open when the inertia switch is in a quiescent condition. During the occurrence of such a predetermined velocity change, the mass operates an actuator of the electrical switch assembly to cause one contact to be further resiliently deflected and engage and also further resiliently deflect the other contact thereby creating switch closure indicating that the predetermined velocity change has occurred.

12 Claims, 5 Drawing Sheets

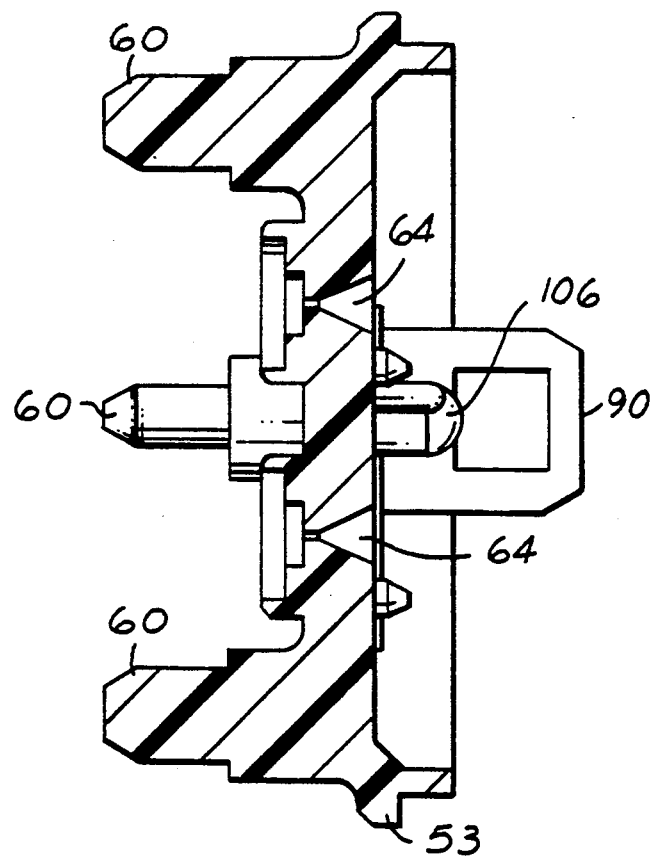
FIG.4
FIG.5
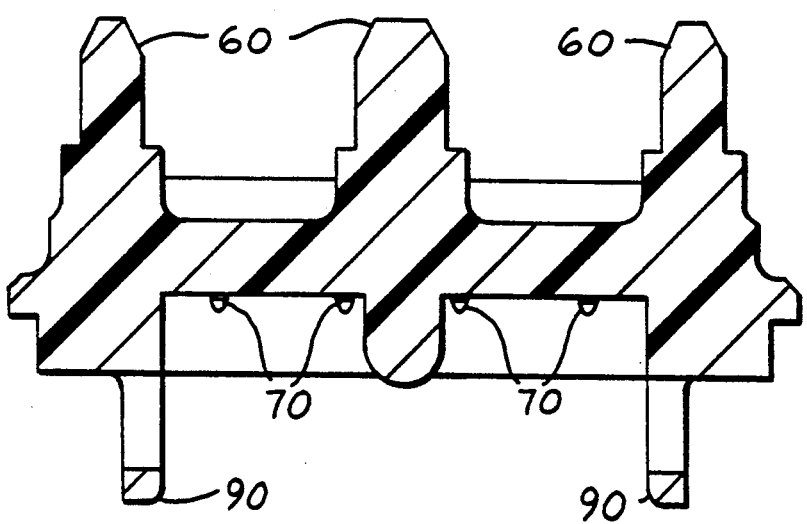

DUAL POLE SWITCH ASSEMBLY FOR AN INERTIA ACTUATED SWITCH

FIELD OF THE INVENTION

While this invention relates generally to inertia switches, the specific improvement resides in the organization and arrangement of a dual pole switch assembly for use in an inertia switch.

BACKGROUND AND SUMMARY OF THE INVENTION

One configuration for a supplemental inflatable restraint system in an automotive vehicle may comprise the presence of multiple supplemental inflatable restraint devices in a single vehicle, for example a driver's side air bag and a passenger's side air bag. Each supplemental inflatable restraint device is initiated by its own independent electrical circuit, and each circuit includes an inertia switch which is devoted exclusively to the corresponding supplemental inflatable restraint device.

While the inertia switches that are exclusive to each supplemental inflatable restraint device must comply with certain engineering specifications, there are certain manufacturing considerations which in the course of mass production of such switches may result in some switches having slightly different, but tolerable, response characteristics from those of other switches. In any given automotive vehicle, such differences may affect the precision with which simultaneous circuit initiations will occur in the event of a deceleration that calls for deployment of the supplemental inflatable restraint devices.

One way of attaining a greater degree of precision in simultaneously signalling multiple supplemental inflatable restraint devices by electrically exclusive switches is to have the switches operated by a single inertial mass instead of by their own individual masses. It can be especially advantageous for the required inertial switch functions to be embodied in a single inertia switch assembly that independently serves plural supplemental inflatable restraint devices. Since the response characteristic of an inertial switch to deceleration is desirably determined for the mostpart by the nature of the inertial mass, as distinguished from the nature of the electrical portion of the switch, the avoidance of duplication of inertial masses and related structure can result in an overall cost savings. Likewise, if one inertia switch assembly can serve plural supplemental inflatable restraint devices, savings on installation time and in the cost of wiring harnesses and electrical connectors that place the inertia switches in the supplemental inflatable restraint electrical circuits may also be realized.

In embodying multiple sets of switch contacts in an inertial switch that has only a single inertial actuator, it is important to assure the mutual isolation (i.e., electrical independency) of the individual sets of contacts and to also provide for the sets to be related in assembly such that each will respond in exactly the same manner upon actuation by the common inertial mass. Furthermore, it may be necessary for the inertial mass to be comparatively small and to execute only a small amount of travel to operate the sets of contacts. Consideration of these factors means that each set of contacts may be required to operate in response to a comparatively small actuating force. In an automotive vehicle it is also necessary that the inertial switch be able to withstand reasonable levels of vibration without giving false indications. Yet, when called upon to be actuated, the sets of contacts must be able to carry a relatively high amount of current even though the duration of that current may be relatively small. For example, a set of contacts may be required to meet a specification of carrying sixteen amps of current for a duration of thirty milliseconds upon actuation. The switch must also be able to withstand a certain amount of overtravel of the inertial mass.

The present invention is directed to a new and improved multiple pole switch assembly for an inertial switch which embodies the following features: greater precision in the simultaneous actuation between individual sets of contacts; reliable actuation of the individual sets of contacts at relatively small actuating forces and relatively small amounts of inertial mass travel; ability to carry required current levels for required amounts of time; avoidance of adding excessive cost to existing supplemental inflatable restraint systems; ability to withstand and function in severe impact situations; maintenance of the independency of each individual set of contacts; and the ability to withstand reasonable levels of vibration. Insofar as the applicant is aware, there is no device currently available which possesses these capabilities, although multiple pole inertial switches are known.

The invention possesses the further advantage of comprising a relatively small number of component parts that have to be assembled together. Many of the features of the invention are embodied in the particular configurations of these individual parts and the relationships between the individual parts. By way of example, the presently preferred dual pole embodiment of switch assembly that will be illustrated and described, comprises seven parts; namely, a ball retainer, a contact support, an actuator disk, and two sets of contacts, each containing a first electrical contact element and a second electrical contact element.

Operational features arising from the disclosed embodiment include: contact travel that is an amplification of the actuator disk travel; the spacing of the contacts in each set and position of the disk in relation to the contacts both being preset by features of the contact support and actuator disc resulting in closer tolerance control over the operating characteristics to ensure that both circuits will be simultaneously signalled with a high degree of precision; and positive prevention of excessive overtravel of the actuator disc. The invention also affords the ability to provide unique calibrations for different models of inertial switches by simply changing the dimension of a portion of the actuator disc.

Further features, advantages and benefits of the invention will be seen in the ensuing descriptions and claims. Drawings accompany the disclosure and illustrate a preferred embodiment of the invention according to the best mode contemplated at the present time in carrying out the invention.

BRIEF DESCRIPTION OF THE DRAWINGS

FIG. 4 is a cross-sectional view taken in the direction of arrows 4—4 in FIG. 3 with the omission of certain parts.

FIG. 5 is a cross-sectional view taken in the direction of arrows 5—5 in FIG. 3 with the omission of certain parts.

DESCRIPTION OF THE PREFERRED EMBODIMENT

Figure 2:
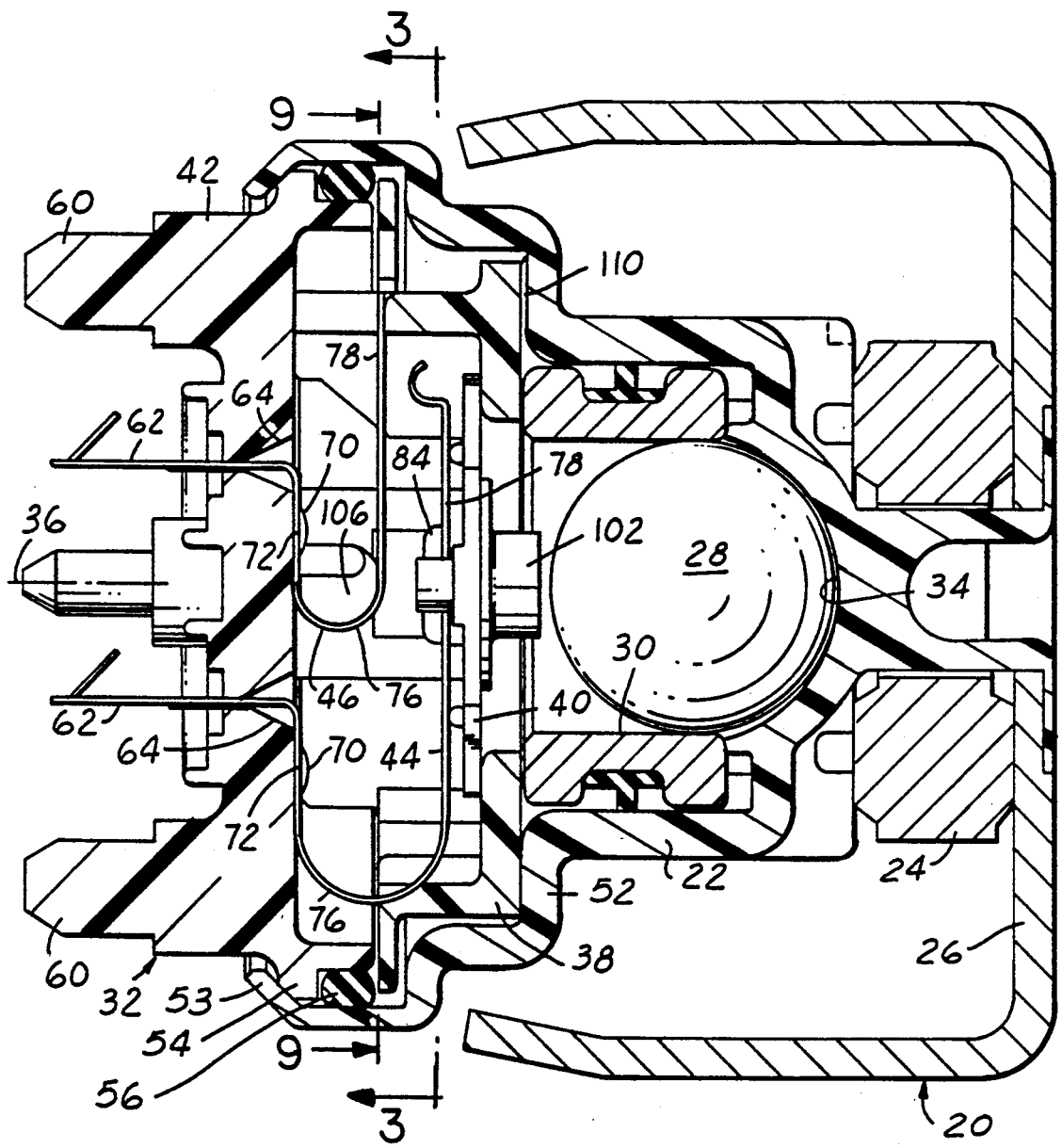
FIG. 2 is a cross-sectional view through the switch of FIG. 1 as taken in the direction of arrows 2—2 in FIG. 1 and slightly enlarged.
Figure 6:
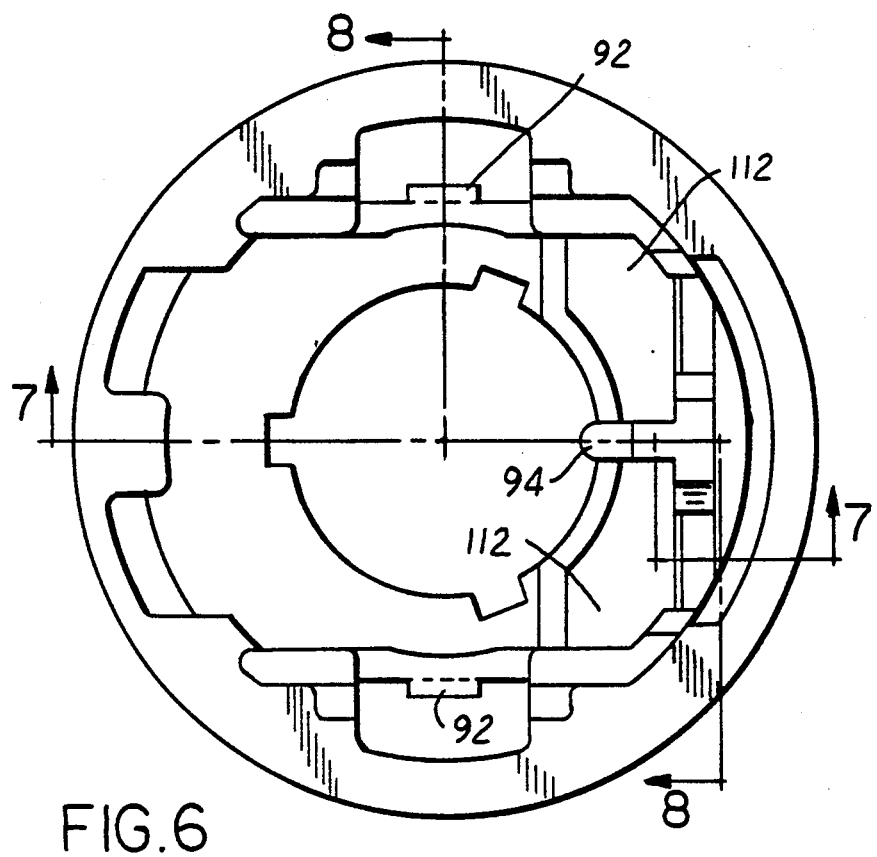
FIG. 6 is an axial view of one of the component parts of FIG. 2 shown by itself.

FIG. 2 shows the organization and arrangement of principal internal components of an inertia switch 20. Inertia switch 20 comprises a body 22, a magnet 24, a metal keeper 26, a ball 28 and a tube 30. It also includes the dual pole switch assembly 32 that embodies the inventive principles disclosed herein.

Ball 28 is the inertial actuator for switch assembly 32 and the operating principles by which ball operates to sense a predetermined deceleration characteristic in a manner known in the art. Briefly, ball 28 is of a suitable ferromagnetic material that in the quiescent condition of inertia switch 20 is forcefully biased into a cup 34 that is formed centrally in body 22, body 22 being a non-ferromagnetic material (i.e., such as a suitable plastic) that allows the magnetic force to act upon the ball. When the inertia switch is subjected to a deceleration force of predetermined characteristic along the direction of the inertia switch's longitudinal axis 36, ball 28 overcomes the magnetic attractive force to travel within tube 30 leftwardly from the position that is illustrated in FIG. 2. The ball has a closely controlled fit within tube 30 whereby certain dampening is imparted to the ball motion. This produces a particular timing characteristic for the inertia switch. When the ball has traveled a certain distance from cup 34, it actuates switch assembly 32.

Figure 1:
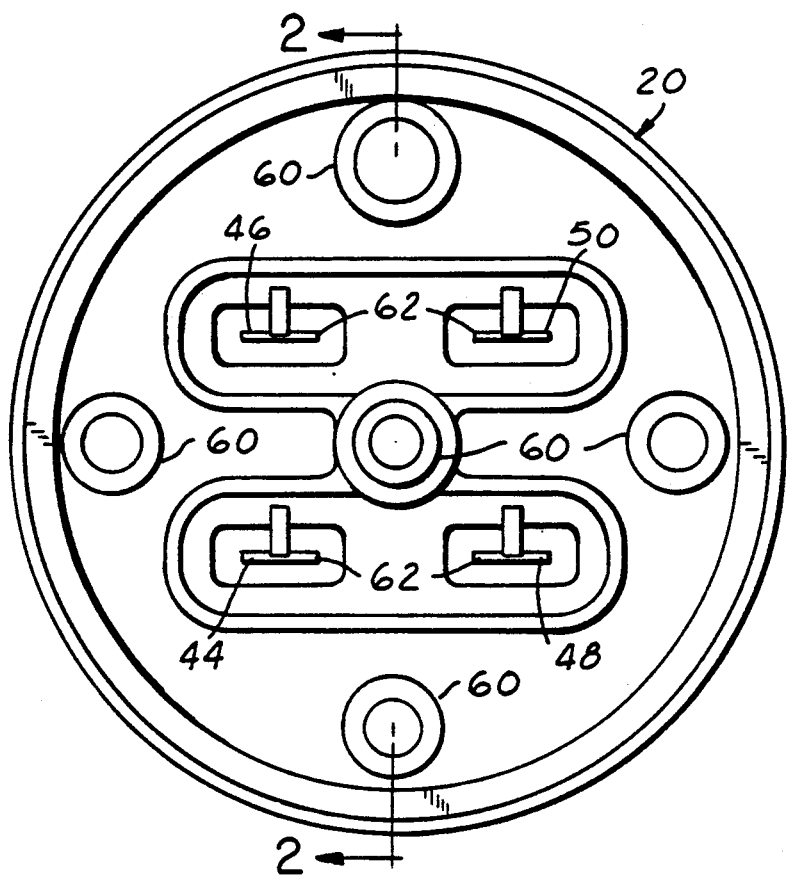
FIG. 1 is an end view of a dual pole inertia switch embodying principles of the invention.
Figure 3:
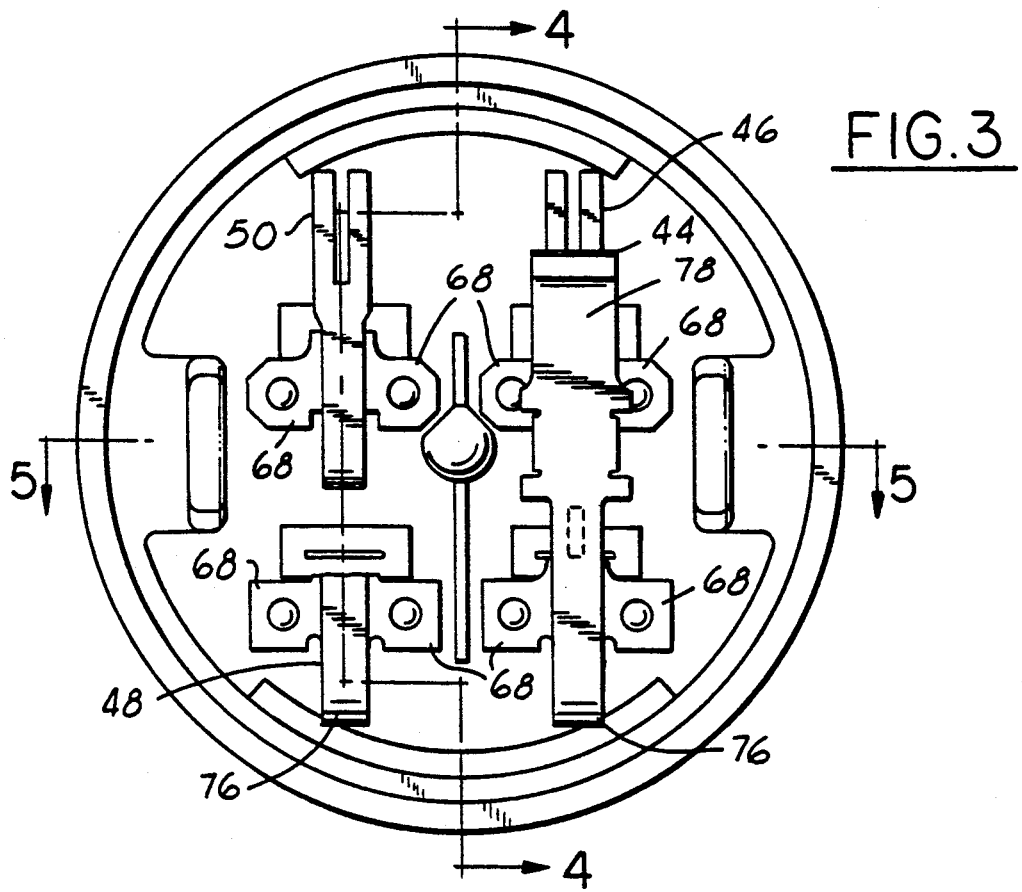
FIG. 3 is a view taken in the general direction of arrows 3—3 in FIG. 2 but on a slightly reduced scale.

Still referring to FIG. 2, switch assembly 32 consists of seven parts that are assembled together to form a dual pole device. These parts are a contact support 38, an actuator disk 40, a ball retainer 42, a first set of contacts consisting of a contact 44 and a contact 46, and a second set of contacts consisting of a contact 48 and a contact 50 (FIGS. 2 and 3). Switch assembly 32 is assembled to the left-hand portion of body 22 as viewed in FIG. 2 by abutting contact support 38 against a shoulder 52 of body 22 and forming the distal end margin 53 of body 22 over a flange 54 of ball retainer 42. An 0-ring seal 56 is disposed between switch assembly 32 and the sidewall portion of body 22 that lies immediately adjacent end margin 53.

The parts 38, 40 and 42 are fabricated preferably from a plastic material that can be accurately molded to closely controlled tolerances and that after molding is dimensionally stable. An example of a suitable material is polyester. Other materials may, of course, be used.

Details of ball retainer 42 are illustrated in FIGS. 1 through 5. On the exterior face as viewed in FIG. 1, the ball retainer comprises a pattern of projections 60 that are intended to locate a circuit board (hereinafter described) that assembles onto switch assembly 32 in the completed inertia switch. Each contact 44, 46, 48 and 50 has an externally projecting terminal portion 62 via which it is placed in circuit connection with mating terminals on the printed circuit board that assembles onto the switch assembly. It can be seen that ball retainer 42 has suitable throughslots 64 through which the contacts pass between the interior and the exterior of the switch assembly.

Each of the four contacts 44, 46, 48 and 50 comprises a pair of apertured ears 68 projecting laterally from opposite sides. These ears provide for attachment of the contacts to the interior of ball retainer 42 by means of heat staking. Prior to such heat staking, the ball retainer has a pattern of projections 70 corresponding to the arrangement for the apertured ears 68 and sized to allow the apertured ears to be fitted over them and against the interior wall of the ball retainer. This initial shape for pins 70 can be seen in FIG. 5. After the completion of the heat staking operation, the pins are deformed into heads that hold the contacts in place in the pattern illustrated in FIG. 3. Thus, each of the contacts 44, 46, 48 and 50 may be considered to have a flat mounting portion 72 that is intermediate the corresponding terminal portion 62 and a generally semi-circularly curved portion 76. Each semi-circularly curved portion 76 is intermediate a generally straight beam 78 and the corresponding flat mounting portion 72. Contacts 44 and 48 are identical but of somewhat smaller size than contacts 46 and 50 which are themselves identical. The semi-circularly curved portion 76 is smaller in contacts 44 and 48 than it is in contacts 46 and 50. Similarly, the beam 78 is shorter in contacts 44 and 48 than it is in contacts 46 and 50.

The drawing figures show all four contacts 44, 46, 48 and 50 in flexed conditions. In their free, unstressed conditions, the beams 78 of each contact would point generally toward the upper right-hand corner of the drawing FIG. 2 so that each would lie generally at an obtuse angle with respect to the corresponding terminal portion 62. The flexion of each beam 78 from the unstressed condition to that of FIG. 2 takes place essentially about the center of curvature of the corresponding semi-circularly curved portion 76.

In the assembly, the free end of the beam 78 of each contact 46 and 50 projects beyond the distal end of the beam 78 of the corresponding contact 44, 48. The distal end of the beam 78 of each contact 44, 48 has a rounded hook-shape that is rounded toward the beam of the corresponding contact 46, 50. As can be seen from FIG. 3, the beams 78 of contacts 44 and 46 are parallel and overlapping, as are the beams 78 of contacts 48 and 50. Also the distal end portion of the beam 78 of each contact 44, 48 is wider than the underlying beam portion 78 of the corresponding contact 46, 50. It is further to be observed that the distal end of the beam 78 of each contact 46,50 is a bifurcation that forms a pair of spaced-apart tines. This bifurcated portion has an overall width that exceeds that of the portion of the same beam that joins with the corresponding semi-circular portion 76.

Figures 9, 10:
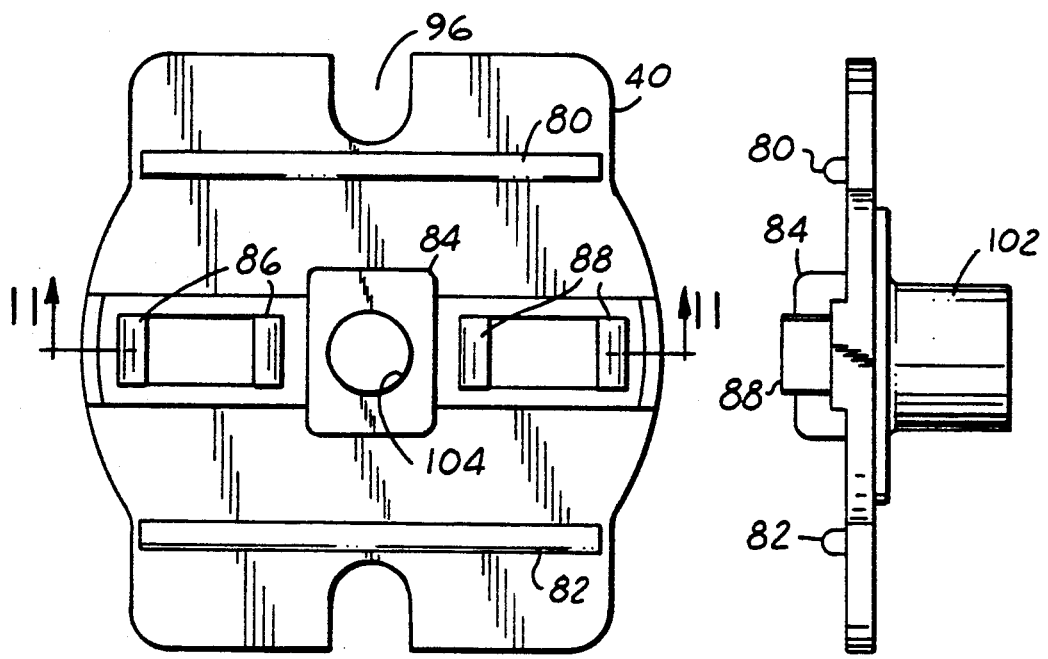
FIG. 9 is an axial view of another of the component parts shown by itself, as taken substantially in the direction of arrows 9—9 in FIG. 2.
FIG. 10 is a right side view of FIG. 9.
Figure 11:
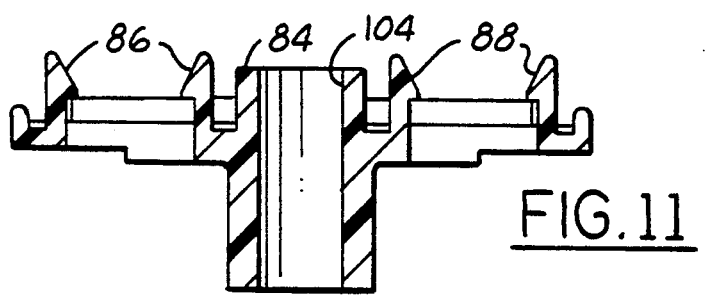
FIG. 11 is a cross-sectional view taken in the direction of arrows 11—11 in FIG. 9.

In switch assembly 32, disk 40 is assembled to the beams 78 of contacts 44 and 48. Details of disk 40 can be seen in FIGS. 9, 10 and 11 in addition to FIG. 2. The beam 78 of each contact 44, 48 bears against disk 40 at two spaced-apart locations that are established by parallel rounded ridges 80 and 82 in the disk. Located to either side of a central rectangular shaped boss 84, are a pair of spaced-apart catches 86 and 88. The central portion of each beam 78 of contacts 46 and 50 is retained on disk 40 by snapping into the corresponding pair of catches 86, 88. For retention purposes, the catches are designed in relation to ridges 80 and 82 such that the beam 78 of each contact 46, 50 is slightly bowed or flexed so as to be very slightly concave in the direction toward ball retainer 42.

After disk 40 has been assembled to contacts 46 and 50, it becomes possible to assemble ball retainer 42 and contact support 38. As can be seen in FIGS. 2, 4 and 5, ball retainer 42 comprises two apertured axially projecting tabs 90 on opposite sides. Contact support 38 has a pair of catches 92 on opposite sides that are adapted to snap into the apertured tabs 90 when the two parts 38 and 42 are aligned with each other and pushed together. During the process of joining the two parts 38 and 42 in assembly, the interior of part 38 will engage disk 40. Disk 40 deflects contacts 44 and 48 from their unstressed conditions until such time as the two parts 38, 42 snap together. The final deflection of contacts 46, 50 will be accomplished by knife edges (hereinafter described) on part 38. At this time contact 44 is disposed relative to contact 46 in the manner portrayed in FIG. 2 while contacts 48 and 50 are similarly related.

Contact support 38 is formed with an axially extending guide rail 94 that serves to locate and guide disk 40 by fitting into a slot 96 in the periphery of the disk. The axial wall of contact support 38 also contains a pair of locators 98 for locating the distal ends of the beams 78 of contacts 46 and 50. Each locator is shaped to have a knife edge 100 on which the beam bears. The locators serve to locate the beams of contacts 46 and 50 laterally for respective alignment with the beams of contacts 44 and 48, and their knife edges also serve to axially locate the beams of contacts 46 and 50.

The nature of the design is such that in the assembly, the distance between the beams of contacts 44 and 46 is made to equal that between the beams of contacts 48 and 50 by controlling the dimensions of only the two parts 38 and 40. The amount of travel that ball 28 will experience before engagement with disk 40 is determined by the axial dimension of a circular boss 102 that is centrally formed on the face of the disk opposite boss 84. A circular throughhole 104 is provided centrally in the disk as an aid to the interaction of boss 84 with a positive stop feature 106 so as to have a soft "bounceless" landing.

Operation of the device is as follows. When subjected to a deceleration force along axis 36 of predetermined characteristic, ball 28 will travel toward disk 40. Upon abutting boss 102, the ball will drive the disk toward ball retainer 42, further flexing contacts 44 and 48 from the position of FIG. 2, such flexing taking place about the centers of the curved sections 76. The rounded hooked ends of the beams of contacts 44 and 48 will contact the bifurcated ends of the beams of contacts 46 and 50 causing independent circuit continuities to be established between contacts 44 and 46 on the one hand and between contacts 48 and 50 on the other hand. The beams of contacts 46 and 50 will now also begin to increasingly flex about their respective curved portions 76. Contact flexing will continue until the motion of the disk and ball is arrested by abutment of boss 84 with the rounded nose of a stop 106 of ball retainer 42.

The two sets of contacts are thereby operated in a uniform manner to cause two independent signals to be given in a highly simultaneous manner. Because short travel distances may be used for ball 28 and the mass of the ball may be small, it is important to minimize the influence of the contacts on the inertia of the ball, and this calls for the contacts, even though resilient, to be quite flimsy. Without more, flimsy contacts can be quite sensitive to ordinary vibrations which occur in normal use of an automotive vehicle. These requirements are seemingly inconsistent for an inertia switch that must successfully distinguish between acceptable vibrations and the occurence of a true need for switch actuation. The principles of the present invention reconcile these inconsistency in a remarkable manner. Neither contact of each set will vibrate toward the other in a manner that would cause spurious switch actuation; yet when the time for switch actuation occurs, the actuation proceeds in a manner that provides suitable contact action for carrying the required current for the required duration. The manner of yielding of the beams tends to avoid contact bounce, and the particular shapes of the ends of the beams promote the attainment of good electrical contact. Because of the manner in which each of the two larger contacts is kept in alignment with the corresponding smaller contact, the larger contacts will not miss their targets when the switch assembly is actuated.

Figure 8:
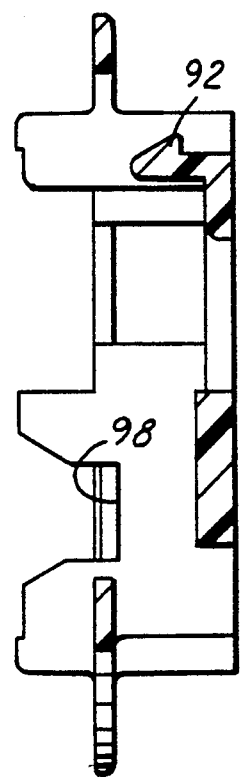
FIG. 8 is a cross-sectional view taken generally along line 8—8 in FIG. 6.
Figure 7:
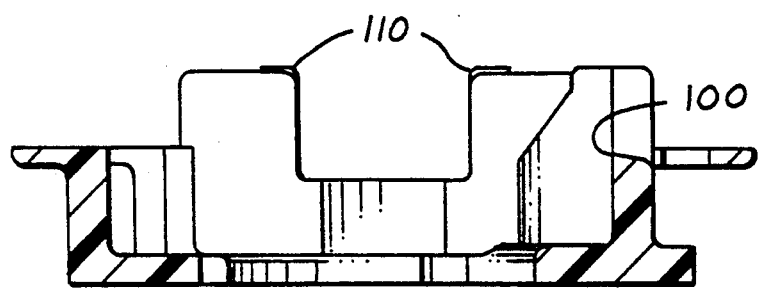
FIG. 7 is a cross-sectional view taken generally along line 7—7 in FIG. 6.

It is contemplated that forms of inertial mass other than a ball may be used, since the inventive features reside in the switch assembly 32. It is likewise contemplated that other manners of relating the larger contacts to the actuator disk may be employed. Thus principles of the invention are established by the ensuing claims which cover the disclosed embodiment and equivalents thereof. Certain specific details in the execution of the illustrated embodiment represent known fabrication practices. For example, in a molded plastic part it may be difficult to precisely control surface flatness around a surface of revolution or any other surface of appreciable area; therefore a known fabrication practice comprises the use of spaced apart locating pads or limited-area locators, such as indicated at 110, and 112 (See FIGS. 7, 8, and 9).

Figure 13:
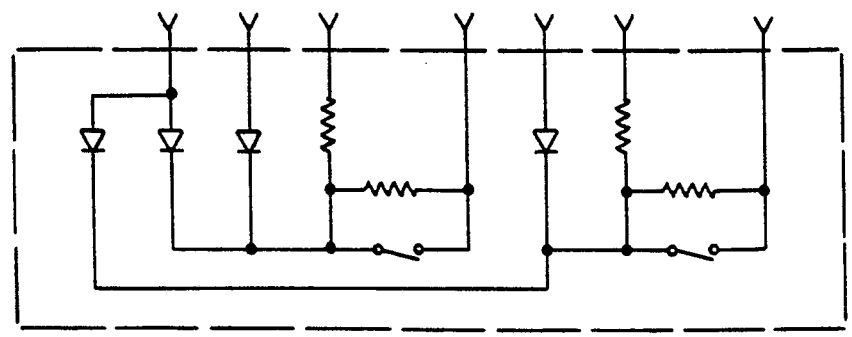
FIG. 13 is an electrical schematic diagram of the circuit board shown in FIG. 12.
Figure 12:
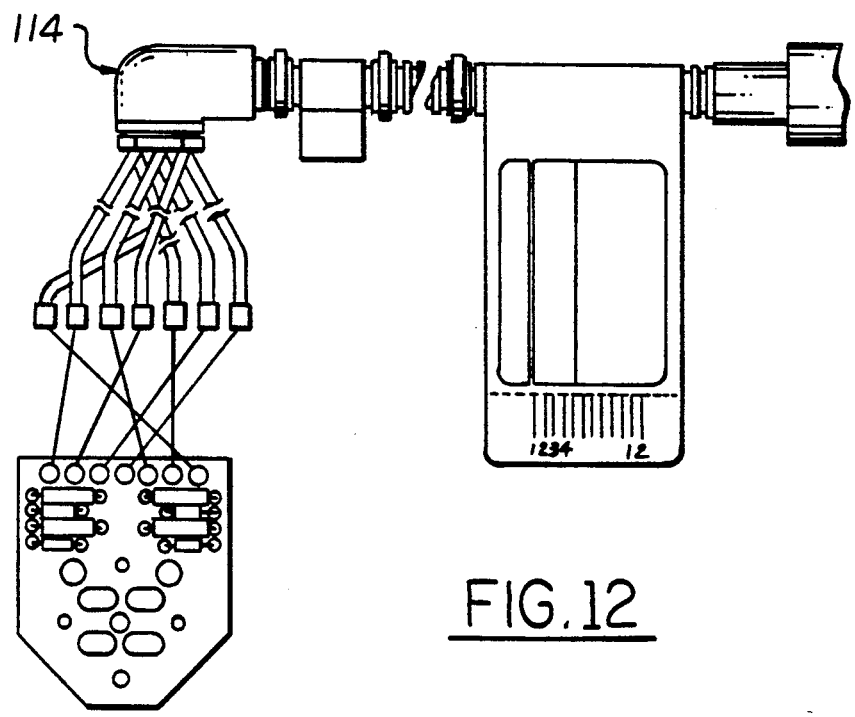
FIG. 12 is a view, partly schematic illustrating a circuit board and wire harness assembly that is intended for use with the switch assembly.

The circuit board and wire harness 114 that connects to the terminal portions of the contacts is shown in FIG. 12. The schematic is depicted by FIG. 13. The circuit is intended to secure true circuit isolation between the two poles of switch assembly 32 so that a fault in one circuit will not automatically create one in the other.

It is typical practice to mount the completed inertia switch inside a mounting package (not shown) so that the switch can be mounted in a suitable location on an automotive vehicle. The semi-circular curvatures in the contacts serves to provide minimum resistance to flexing, and because the actuator disk acts on the two larger contacts closer to their semi-circular curvatures, there is an amplification in the travel of the distal ends of the contacts. This latter feature is beneficial because the nominal quiescent spacing distance between contacts in each set can be larger would be the case if such amplification were not present. Sensors can be provided with different calibrations by merely changing the axial dimension of boss 102. Thus, the invention has been shown to possess many useful features.

What is claimed is:

1. In an inertia switch device in which a normally restrained inertial mass overcomes its restraint in response to a predetermined velocity change, such as a deceleration, to displace the actuator of an electrical switch assembly via which the device gives a signal of the occurrence of such a predetermined velocity change, the improvement which comprises said electrical switch assembly comprising a contact enclosure containing a set of two, resiliently deflectable electrical contacts both of which contacts are disposed in resiliently deflected conditions within said contact enclosure to a predetermined spacing distance so long as the device does not experience such predetermined velocity change, said actuator being disposed on said electrical switch assembly for displacement along a predetermined path of travel with respect to said set of contacts for acting upon said set of contacts when such predetermined velocity change occurs, one of said two electrical contacts being further resiliently deflected in response to displacement of said actuator along said predetermined path of travel upon occurrence of such predetermined velocity change to engage and also further resiliently deflect the other contact of said set thereby creating switch closure of said set causing the device to give a signal indicative of the occurrence of such predetermined velocity change.

2. The improvement set forth in claim 1 in which said one contact comprises a beam portion that projects from an adjoining generally semi-circularly curved portion of said one contact, said generally semi-circularly curved portion being supported on said contact enclosure.

3. The improvement set forth in claim 2 in which said other contact also comprises a beam portion that projects from a corresponding adjoining generally semi-circularly curved portion of said other contact, the beam portion of said one contact making contact with the beam portion of said other contact to cause switch closure of said set.

4. The improvement set forth in claim 3 wherein the beam portion of said one contact is disposed substantially parallel with the beam portion of said other contact when the device is in a quiescent condition, the generally semi-circularly curved portion of said one contact having a larger radius of curvature than that of said other contact.

5. The improvement set forth in claim 4 further including a limit stop for arresting the displacement of said actuator after a certain amount of additional travel after the initial contact of said one contact with said other contact, said limit stop comprising a projection having a rounded distal end, said actuator having a centrally located apertured boss that abuts said rounded distal end of said projection.

6. The improvement set forth in claim 2 further including an attachment via which the actuator attaches to the beam portion of said one contact.

7. The improvement set forth in claim 6 in which said attachment comprises spaced apart bearing points against which the beam portion of said one contact is slightly deformedly held.

8. The improvement set forth in claim 7 in which the beam portion of said one contact is slightly deformedly held against said spaced apart bearing points by means of a snap attachment.

9. The improvement set forth in claim 1 in which said contact enclosure comprises plural enclosing structures coacting to form said contact enclosure, one of said plural enclosing structures having one portion thereof engaging said one contact to establish the positioning thereof at the quiescent condition of the device, and the positioning of the other contact of said set being set at the quiescent condition of the device by abutment of said actuator with another portion of said one enclosing structure.

10. The improvement set forth in claim 9 in which said another portion of said one enclosing structure comprises a knife edge bearing against said other contact.

11. The improvement set forth in claim 9 in which said actuator is guided along said predetermined path of travel by a guide on said one enclosing structure that engages a slot in said actuator.

12. The improvement set forth in claim 9 in which said another portion of said one enclosing structure comprises means to laterally constrain said other contact.

* * * * *